United States Patent [19]

Pine

[11] Patent Number: 4,497,587
[45] Date of Patent: Feb. 5, 1985

[54] THREE-PAD JOURNAL BEARING

[75] Inventor: R. Davis Pine, Ballston Lake, N.Y.

[73] Assignee: General Electric Company, Schenectady, N.Y.

[21] Appl. No.: 505,749

[22] Filed: Jun. 20, 1983

[51] Int. Cl.³ ............................................. F16C 17/03
[52] U.S. Cl. ..................................... 384/117; 384/309
[58] Field of Search ............... 384/107, 114, 117, 121, 384/122, 303, 306, 307, 309, 310, 311, 322, 368, 369, 397, 398

[56] References Cited

U.S. PATENT DOCUMENTS

| | | | |
|---|---|---|---|
| 3,378,319 | 4/1968 | Cutting et al. | 384/100 |
| 3,823,991 | 7/1974 | Lamperski | 384/309 |
| 3,972,572 | 8/1976 | Hohn | 308/73 |
| 4,247,157 | 1/1981 | Sigg | 308/73 |

OTHER PUBLICATIONS

"Journal Bearings for Industrial Turbosets" by K. Knoss, Brown-Boveri Review, May, 1980, pp. 300-308.

Primary Examiner—Stuart S. Levy
Assistant Examiner—David Werner
Attorney, Agent, or Firm—Paul Checkovich; John F. Ahern

[57] ABSTRACT

An oil lubricated, double tilting, three pad journal bearing includes three pads asymmetrically located with respect to each other and with respect to the horizontal and vertical centerline of a horizontally disposed steam turbine shaft. Each pad has associated therewith an oil feed dam. Apparatus for lubricating supplies oil to a channel, formed by the feed dam and its corresponding pad, and the rotating shaft draws the oil from the reservoir as a film into the interstice defined by the shaft surface and the pad face.

11 Claims, 3 Drawing Figures

THREE-PAD JOURNAL BEARING

BACKGROUND OF THE INVENTION

This invention relates generally to journal bearings for supporting horizontally oriented steam turbine shafts, and particularly to a three-pad journal bearing wherein the pads are of different arcuate lengths, are asymmetrical with respect to each other and with respect to the horizontal and vertical centerlines of the shaft, and each pad has associated therewith an oil feed dam immediately preceeding its leading edge.

In a large steam turbine, several sets of buckets are mounted on the steam turbine shaft and axially spaced-apart along the shaft to form a complete rotor. Each set of buckets, or each turbine stage, changes the enthalpy of the steam passing axially through the turbine which causes the rotor to rotate. The force of the steam admitted into the turbine affects the rotor. As is well known in the art, the direction and magnitude of this force is influenced by the particular control mode of operation for the turbine, i.e., full arc steam admission mode or partial arc mode. Hence, although the rotor primarily rotates about its axis, the turbine shaft also experiences both horizontal and vertical movements due to these forces.

Commonly a plurality of bearings are located at various axial locations along the shaft. Some bearings of a steam turbine include several pads which space the rotatable shaft away from the bearing casing. These bearings are normally lubricated with oil and some of this oil is distributed between each pad face and the shaft's surface. In operation, the oil in the interstice between the pad face and the shaft surface hydrodynamically lifts the shaft off the face of the pad. The amount of lift developed in the bearing determines the stiffness of the bearing to horizontal and vertical forces acting upon the shaft. In this manner, the bearing dampens the horizontal and/or vertical movements of the shaft, as well as, rotatably supports the shaft without placing large frictional forces thereon which inhibit the rotation of the shaft. The frictional forces inherent within the bearing, and hence power losses, are minimized by the oil film in the interstice defined by the rotating shaft surface and the face of the pad. Additionally, the oil film cools the pad face, which is heated by friction, thereby protecting the integrity of the bearing.

Due to the great weight of the turbine carried by the shaft in combination with the speed of rotation of the shaft, a bearing which loses this oil film in one or all of its interstices deteriorates rapidly because the shaft surface wipes the pad face and, consequently, the shaft and/or the pad face may be scored. The resulting inefficiency of a wiped bearing is well known in the art. Additionally, when the shaft surface does come in wiping contact with the pad face, great frictional forces are generated by that contact which affects the immediate performance of the steam turbine.

Since horizontal and vertical damping of the turbine shaft motion is an important function of the bearing, three pad bearings have been developed. The three pad bearing lessens the total amount of pad face area which interacts with the shaft surface, thereby lowering the total viscous shear of the oil, and hence, lowering the total frictional forces and power losses developed within the bearing. However, the minimization of the shaft surface/pad face interface introduces arcuate spaces between each pad, i.e., the space defined by the trailing edge of the preceeding pad, the leading edge of the next or succeeding pad, the shaft surface and the radially inner surface of the bearing casing.

Since the lubricating oil cools the pad face, as well as provides support for the shaft, a continuous stream of oil normally flows through the interstice between each pad face and the adjacent shaft surface. The oil is ejected proximate the trailing edge of each pad. The ejected oil churns within the arcuate space and such churning is believed to cause some power loss in the bearing.

Although means for draining or evacuating the "hot" oil, i.e., the oil ejected from the preceeding pad's interstice, from these arcuate spaces could be improved, a problem still exists in supplying the next or succeeding pad's interstice with enough cool, lubricating oil to maintain the oil film which continuously flows in the latter interstice. This particular problem is termed "hot oil carry-over" herein. One prior art device, described in U.S. Pat. No. 4,247,157, issued to Sigg, sprays oil from nozzles, located along the axial length of each pad, towards the leading edge of the pad face. The prior art device also includes a shield affixed to the nozzle which has a radially inner edge, proximate the rotating shaft surface, which shields the fresh lubricating oil spray from the oil ejected from the preceding pad. However, the prior art device does not address the problem of oil churning in the arcuate spaces and mixture of the fresh lubricating oil with the hot oil carried-over from the preceeding pad. Additionally, this prior art device may not be operable with the low pressure supply of lubricating oil commonly utilized in large steam turbine lubricating systems (commonly 10 to 15 pounds per square inch) because the oil in the patented device must, by necessity, be under relatively high pressure to be sprayed from the nozzle. Aeration of the oil may also present a problem.

OBJECTS OF THE INVENTION

It is an object of this invention to provide for an oil lubricated, three pad journal bearing which exhibits relatively less stiffness to horizontal movements of the shaft than to vertical movements of the shaft.

It is another object of this invention to provide for a three pad journal bearing wherein the churning losses caused by the oil ejected from the preceeding pad into the arcuate spaces between each pad are reduced.

It is a further object of this invention to provide for a three pad journal bearing which has reduced sensitivity to wear.

It is an additional object of this invention to provide for a pad journal bearing which includes an oil feed dam immediately adjacent to the leading edge of each pad which creates a reservoir of oil to be drawn as a film into the interstice between the pad face and the rotating shaft and which segregates the oil ejected from the preceeding pad thereby limiting hot oil carry-over in the bearing.

SUMMARY OF THE INVENTION

In a preferred embodiment, the three pad journal bearing supports a horizontally disposed, rotatable steam turbine shaft on an oil film in the interstice between each pad face and the rotating shaft surface. A lower arcuate pad spaces the shaft away from the bearing casing and supports the shaft below the horizontal centerline of the shaft. The lower pad's radial centerline is offset and is negatively displaced from the shaft's vertical centerline between 5° and 20°. Two upper arcuate pads, smaller than the lower pad, space the shaft away from the casing and are disposed above the horizontal centerline of the shaft. The upper pads' radial centerlines are asymmetrically located with respect to the lower pad's radial centerline and with respect to the horizontal centerline of the shaft. One pad's centerline is negatively displaced from the shaft's horizontal centerline by 35° to 45° and the other pad's centerline is positively displaced from the horizontal centerline by 15° to 25°. Each pad has associated therewith an oil feed dam located proximate the leading edge of the pad. The feed dams are part of means for supplying lubricating oil into the bearing. Each feed dam has a damming ridge extending radially inward from the casing to within close proximity of the shaft surface. A channel is defined between the trailing edge of the ridge, the leading edge of corresponding pad and a radially inner channel surface of the feed dam. Fresh lubricating oil is delivered into the channel through a plurality of feed lines in the feed dam thereby creating a reservoir of oil in the channel. The rotating shaft draws oil from this reservoir and a continuous film flows through the interstice. This film of oil maintains the shaft in non-wiping contact with the pad face. The bearing also includes means for evacuating the oil from the bearing. The damming ridges substantially segregate the oil reservoir of each pad from the oil ejected from the preceeding pad to minimize the hot oil carry-over between adjacent pads and allowing the hot oil to be removed from the arcuate spaces by the evacuation means. In a preferred embodiment, each pad is pivotally mounted on the inner surface of the casing at a predetermined circumferential location offset from their respective radial centerlines.

BRIEF DESCRIPTION OF THE DRAWINGS

While the specification concludes with claims particularly pointing out and distinctly claiming the subject matter regarded as the invention, the invention will be better understood, and additional objects of the invention will be apparent, from the following description taken in conjunction with the accompanying drawings in which:

DETAILED DESCRIPTION

Figure 1:
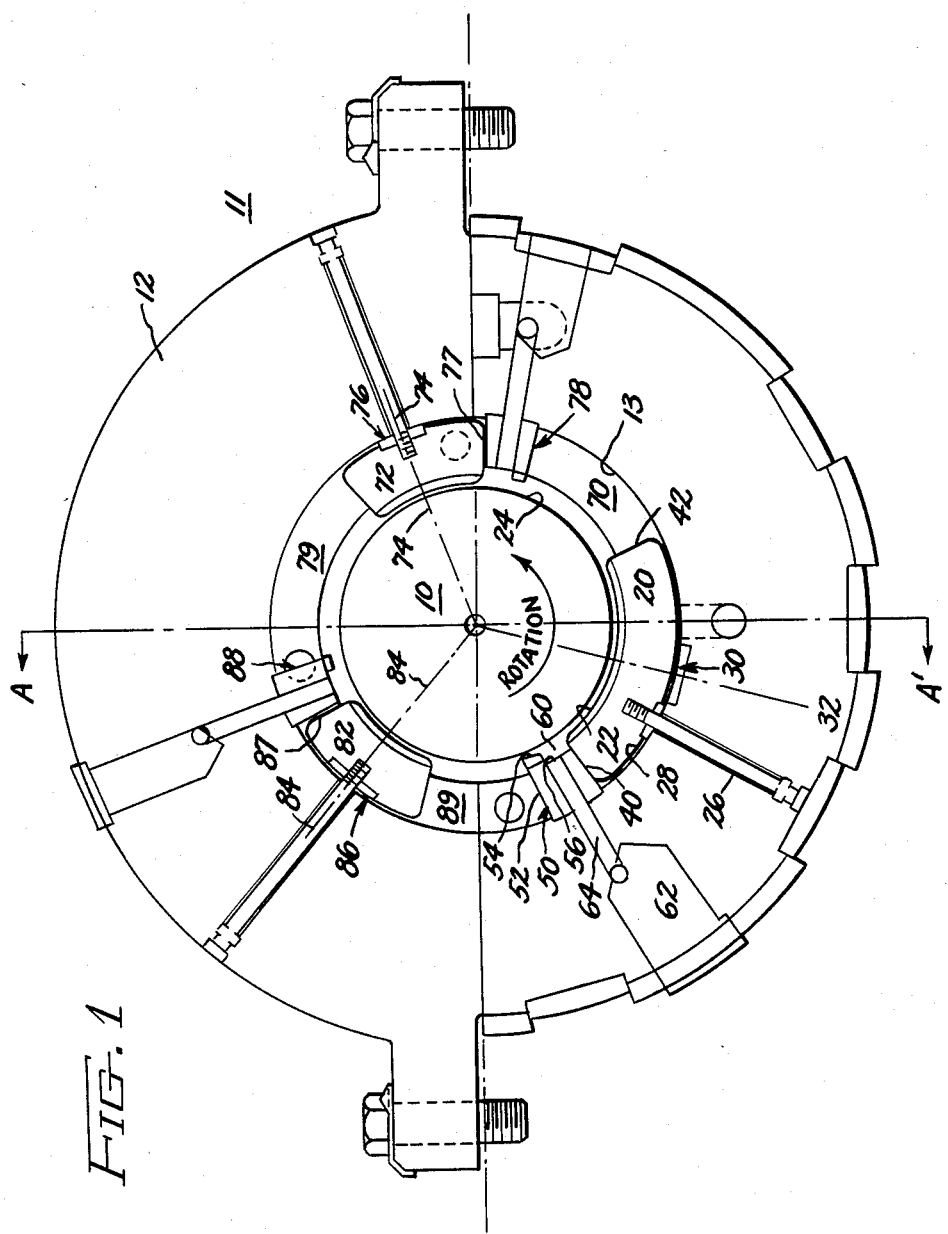
FIG. 1 illustrates a radial view of a three pad journal bearing constructed in accordance with the principles of the invention which includes the three asymetrically offset pads and their associated oil feed dams.

FIG. 1 illustrates a radial view of a three pad journal bearing 11 constructed in accordance with the principles of this invention. A shaft 10 has its vertical and horizontal centerlines shown in FIG. 1. Shaft 10 is coaxially surrounded by a bearing casing 12. Three bearing pads 20, 72 and 82 space shaft 10 away from inner surface 13 of casing 12.

A lower arcuate bearing pad 20 is located below the shaft's horizontal centerline and provides substantially the only means for supporting shaft 10 below that centerline. The pad's face 22 has a layer of babbit thereon which provides a good bearing surface between pad 20 and surface 24 of shaft 10. The rotational direction of shaft 10 is shown by an arrow in FIG. 1. Pad 20 is mounted within casing 12. The pad is restrained from rotating within casing 12 by an antirotation pin 26 which extends radially inward from the casing into the radially outer portion of pad 20.

Pad 20 has an outer radial surface 28 which has a smaller radius of curvature in this radial plane than surface 13's radius of curvature, such that the pad is able to pivotally react about the circumferential location represented by point 30 on the casing's inner radial surface 13. In other words, pad 20 pivotally reacts, about representative point 30, to horizontal and/or vertical movements of shaft 10. Pad 20 has a radial centerline 32 which is offset from the vertical centerline of the shaft. Radial centerline 32 is negatively displaced from the shaft's vertical centerline between 5° and 20°. The terms "negative" and "positive displacement" as used herein refer to the location of the identified item vis-a-vis a know reference line and the direction of rotation. Hence, a pad, which is negatively displaced with respect to the vertical centerline of a shaft rotating counterclockwise, is in front of the centerline and is affected by a point on the rotating shaft before that point passes through the vertical centerline of the shaft. Conversely, a positively displaced pad is behind the centerline and is affected after the point passes the shaft's centerline. Pad 20 has an arcuate length of between 70° and 90°.

In a specific embodiment, a 20" by 16½", three pad, double tilting bearing, pad 20 has an 80° arcuate length about shaft 10, its radial centerline 32 is negatively displaced from the vertical centerline of the shaft by 13° and pivots about circumferential location 30, which point is negatively displaced with respect to centerline 32 by approximately 4°. This offset pivotal location is commonly called a 55% offset. The percentage is derived from the ratio of the arcuate distance between the pivot point and the leading edge of the pad versus the total arcuate length of the pad. The terminology "leading" and "trailing" refers to the direction of rotation and the location of that particular item. Hence, the leading edge 40 of pad 20 will be affected by a particular point on rotating shaft 10 earlier in time than the trailing edge 42 of pad 20 assuming the counter-clockwise direction of rotation illustrated in FIG. 1.

Pad 20 has associated with it an oil feed dam 50 located separate and apart from pad 20 but proximate leading edge 40. Oil feed dam 50 is affixed to inner surface 13 of casing 12. Although oil feed dam 50 must be relatively close to leading edge 40, there must be some space therebetween to allow pad 20 to pivot about location 30.

Oil feed dam 50 includes a damming ridge 52 which radially extends from surface 13 to within close proximity of shaft surface 24. The inner radial surface or face 54 of damming ridge 52 has a layer of babbit thereon, i.e., surface 54 is tipped with babbit. Oil feed dam 50 also includes a radially inner channel surface 56. A channel 60 is defined by damming ridge 52, channel surface 56 and the leading edge 40 of pad 20.

Means for lubricating each pad of bearing 11 includes oil supply passage 62 and radially extending feed line 64 which extends through oil feed dam 50. Lubricating oil is supplied at a relatively low pressure, approximately 10 to 15 pounds per square inch, into passage 62. The lubricating oil, which in large steam turbines is light turbine oil, International Standards Organization, Standard VG 32, is delivered into channel 60 through the passage and line. A reservoir of oil is created in channel 60 as a result of this oil supply. The rotation of shaft 10 draws the oil from the reservoir, by its viscous pumping action, into the interstice between shaft surface 24 and pad face 22. This viscous pumping action forms a continuously flowing film of oil across the pad face which maintains pad face 22 in nonwiping contact with surface 24.

As discussed earlier, it is important for this bearing to maintain the film of oil between shaft surface 24 and pad face 22. The film of oil provides stiffness to the bearing and provides damping of vertical and horizontal motion of the shaft thereby countering the forces transmitted through the shaft to the bearing. In the particular case of pad 20, the pad absorbs primarily vertical movements of shaft 10.

The bearing's dynamic properties are not as sensitive to wear as a six pad bearing. With normal use of the bearing, the lower pad face and other sections of this pad will wear away. This wear occurs in most turbine shaft bearings. However, in six pad bearings, the two lower pads adjacent the bottom most pad do not wear as much as the bottom most pad, hence the dynamic performance of the bearing is affected by wear. In contrast, the three pad bearing has no lower adjacent pads and is not so effected by wear.

The film of oil, which flows in the interstice between pad face 22 and shaft surface 24, is forced along pad face 22 by the viscous pumping action of the rotating shaft. The oil is ejected from the interstice proximate trailing edge 42 of pad face 22 into arcuate space 70. Arcuate space 70 is defined by trailing edge 42, surface 13, the leading edge of the succeeding or next oil feed dam 78 and shaft surface 24.

Bearing 11 includes at least two upper arcuate bearing pads 72 and 82. Pads 72 and 82 space shaft 10 away from casing 12 and are located above the horizontal centerline of the shaft. Pads 72 and 82 are arcuately smaller than pad 20, and each pad occupies between 40° and 50° of the total circumference of the shaft. In a specific embodiment, both pads have 45° arcuate lengths. The radial centerline 74 of pad 72 is positively displaced from the horizontal centerline of the shaft between 15° and 25°, and in a specific embodiment, the centerline of pad 72 is displaced from the horizontal centerline by 20°. Pad 72 pivots about representative circumferential location 76 on surface 13 of casing 12. Point 76 is 60° offset, i.e., point 76 is 60% of the arcuate distance from the pad's leading edge 77. Therefore, point 76 is positively displaced from centerline 74 by 4.5°. Pad 72 has associated therewith an oil feed dam 78, which, in combination with the illustrated lubricating means, supplies a reservoir of oil for pad 72's interstice. The specific structure of pad 72 and the operation of oil feed dam 78 in conjunction with its corresponding pad is substantially similar to that described with respect to lower arcuate pad 20.

Upper arcuate pad 82 has a radial centerline 84 which is negatively displaced from the horizontal centerline of shaft 10 by between 35° and 45°. Pad 82 pivots about representative circumferential location 86 on surface 13 of casing 12. In one embodiment, pad 82 has an arcuate span of between 40° and 50°, and in a specific embodiment, pad 82 has an arcuate span of 45°. In that latter embodiment, the pad's radial centerline 84 is displaced from the horizontal centerline of the shaft by 40° and pad 82 pivots about point 86 which is 60% offset from the leading edge 87 of pad 82. In other words, pivot point 86 is positively displaced from centerline 84 by 4.5°. Pad 82 has associated with it an oil feed dam 88. In a similar fashion to pad 72 and pad 20, pad 82 has a pad face with a layer of babbit thereon and oil feed dam 88 cooperates with pad 82 by providing a reservoir of oil in the channel immediately preceeding leading edge 87 of pad 82. Rotating shaft 10 draws oil from the reservoir which flows as a film through the interstice. Arcuate space 79 exists between pad 72 and feed dam 88 and space 89 exists between pad 82 and feed dam 50.

The locations of pad 72 and 82 with respect to both the horizontal and vertical centerlines of the shaft, in addition to the position of pad 20 with respect to those pads provides this a bearing with much less stiffness to horizontal movements than to vertical movements of shaft 10. Also, the asymmetrical location of pads 20, 72 and 82 may be slightly adjusted, hence bearing 11 can be customized to match the dynamic performance of a particular steam turbine shaft since different turbines develop slightly different forces and directions of movements therein.

Figure 2:
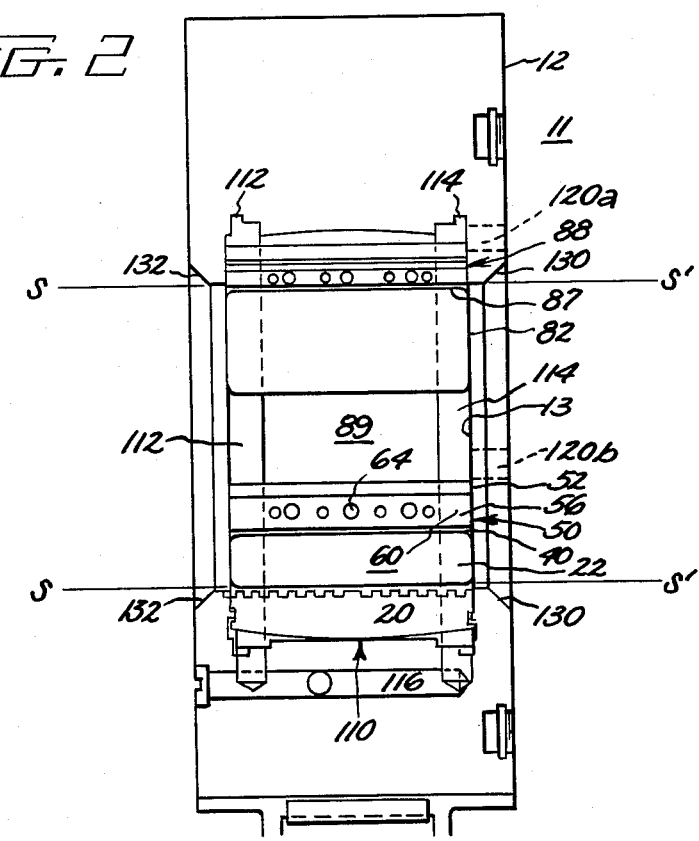
FIG. 2 illustrates an axial view of the bearing constructed in accordance with the principles of this invention taken along line A—A' in FIG. 1.

Bearing 11 can be understood better in conjunction with FIG. 2 which is the axial view of the bearing taken along line A–A'. Line A–A' is the vertical centerline of the bearing in FIG. 1. Similar components of the bearing identified in FIG. 1 are similarly numbered in FIG. 2, however, shaft 10 has been removed from FIG. 2 for clarity. The horizontal disposition of shaft 10 is noted in FIG. 2 by lead lines S–S' which extend from the left hand side of the Figure to the right hand side. With respect to lower arcuate pad 20, FIG. 2 illustrates pad face 22 having a layer of babbit thereon. In a preferred embodiment, each pad has an axial pivot point, thereby creating a double tilting, three pad bearing. The axial pivot point of pad 20 is shown at axial location 110. Hence, the pads are capable of axial pivotal movement, thereby adjusting to shaft 10's motions along its axial length. Oil feed dam 50 is proximate leading edge 40 of pad 20. Oil feed dam 50 runs the axial length of pad 20, as does oil feed dam 88, associated with pad 82, as shown in FIG. 2. Feed dam 78 and pad 72 is not shown in this view.

Returning now to oil feed dam 50 which is associated with pad 20, feed dam 50 includes a plurality of radially extending feed lines therethrough, one of which is designated 64. This plurality of feed lines supplies oil to channel 60 thereby creating a reservoir of oil immediately preceeding the leading edge 40 of pad face 22. It is to be understood that all references to feed line 64 can be equally applied to the plurality of feed lines described herein. The diameter of feed line 64 and the diameters of the balance of feed lines are relatively large, in comparison with the arcuate span of channel 60, to allow the uninhibited flow of oil into the channel because the reservoir of oil should be maintained to provide for the continuous flow of oil across pad face 22. Damming ridge 52 of oil feed dam 50 extends radially from inner surface 13 to within close proximity of shaft surface 24 and segregates the oil reservoir of pad 20 from substantially all oil which is ejected from the interstice of pad 82.

The presence of damming ridge 50, substantially limits hot oil carry-over from the preceeding pad 82 and segregates the oil reservoir in channel 60 from the ejected hot oil. Damming ridge 52, in cooperation with a pair of axially spaced apart grooves 112 and 114 on surface 13 of casing 12, lowers the power loss caused by the churning of oil in space 89 because grooves 112 and 114 are in communication with a drain passage 116 which extends axially through casing 12. In other words, damming ridge 52 segregates the hot oil in arcuate space 89 from the oil reservoir in channel 60 and assists in the evacuation of the hot oil from arcuate space 89. Oil is removed from the bearing by grooves 112 and 114 and passage 116. Casing 12 also includes axial drain passages 120a and 120b, illustrated in FIG. 2, as extending through the right hand side of casing 12 in FIG. 2. These axial drain passages are optional. However, they may assist in lowering the power loss caused by the churning of oil in the bearing. The bearing casing has lips 130 and 132 on either axial end to limit the axial movement of pads 20, 72 and 82 within the bearing casing 12.

Figure 3:
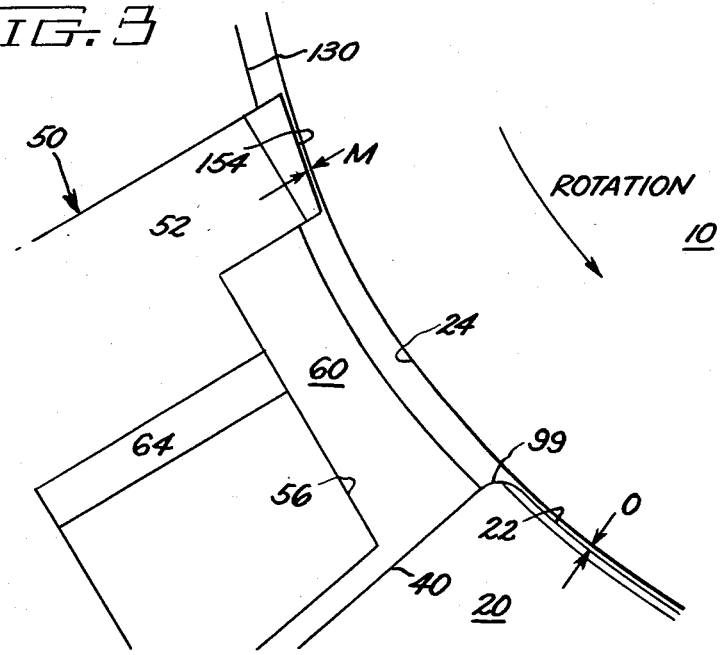
FIG. 3 illustrates a blownup view of a portion of one oil feed dam and the leading edge of its associated pad from a radial view similar to that shown in FIG. 1.

FIG. 3 is a blownup view of a portion of FIG. 1 which includes oil feed dam 50 spaced proximate yet separate and apart from leading edge 40 of pad 20. As in FIGS. 1 and 2, similar numbers relate to similar components in FIG. 3. FIG. 3 clearly illustrates channel 60 which is defined by damming ridge 52, channel surface 56, and leading edge 40 of pad 20. Damming ridge 52 comes within close proximity of shaft surface 24.

The radial distance of the gap between surface 54 of damming ridge 52 and shaft surface 24 is designated M in FIG. 3. The radial distance of interstice between pad face 22 and shaft surface 24 is labeled O in FIG. 3. It is to be understood that the radial distance of the interstice is the minimum radial distance between the face and the surface during normal bearing operation. In a preferred embodiment, distance O is slightly smaller than the distance M. As is clearly illustrated in FIG. 3, surface 54 has a layer of babbit thereon as does pad face 22. The leading corners of each pad may be beveled, as illustrated in FIG. 3 at corner 99 between edge 40 and face 22. This bevel assists in the drawing of oil into the interstice of each pad.

It is to be understood that the claims appended hereto are intended to cover modifications as described herein. The three pad bearing described and claimed herein may be one of a number of bearings as part of the support system for the rotor of a large steam turbine. Also, the bearing may be part of the support system for a generator shaft which is commonly coupled to the turbine shaft. It is to be understood that the oil feed dams described and claimed herein may be utilized in a bearing which has more than three pads. In this situation, each pad would have a corresponding oil feed dam located proximate yet spaced apart from its leading edge. Primarily, the invention herein relates to a three pad bearing with each pad being associated with an oil feed dam. The oil feed dam creates a reservoir of oil immediately preceeding the leading edge of the pad and segregates hot oil from the preceeding pad from the oil reservoir of the feed dam's corresponding pad.

What is claimed is:

1. An oil lubricated three pad journal bearing for supporting a horizontally disposed, rotatable steam turbine shaft, said bearing including a bearing casing, comprising:

a lower arcuate bearing pad for spacing said shaft away from the bearing casing and for supporting the shaft below the horizontal centerline of the shaft, the radial centerline of said pad being offset with respect to the vertical centerline of the shaft, said lower bearing pad including an arcuately extending pad face operatively spaced from the shaft;

two upper arcuate bearing pads for spacing said shaft away from said casing above the horizontal centerline of the shaft, each upper pad being arcuately smaller than said lower pad and the radial centerline of each upper pad being assymmetrically located with respect to the radial centerline of said lower pad and further with respect to the horizontal centerline of the shaft, each said upper bearing pad respectively including an arcuately extending pad face operatively spaced from the shaft; and lubricating means for lubricating each pad, said lubricating means including a feed dam respectively associated with each pad, each feed dam located proximate the leading edge of its corresponding pad, each feed dam including a respective damming ridge extending radially inward from said casing, each damming ridge including an arcuately extending face operatively spaced from the shaft wherein the respective face of each respective damming ridge is operatively radially spaced from the shaft a distance greater than the operative radial spacing of the respective corresponding pad face from the shaft, each said feed dam defining a respective channel between the trailing edge of said respective ridge, the leading edge of said respective corresponding pad and a respective radially inner channel surface of each said respective feed dam, each said respective channel surface operatively spaced from the surface of the shaft, said lubricating means further including supply means for delivering oil into each said channel, thereby creating a reservoir of oil in each said channel such that while rotating the shaft draws oil from said reservoir to form a continuously flowing film of oil across each pad face, said film of oil maintaining the shaft surface in non-wiping contact with each pad face.

2. A bearing as in claim 1 wherein each of said feed dams is affixed to the inner surface of said casing and each of said dams is spaced from its corresponding pad.

3. A bearing as in claim 2 wherein each pad is pivotally mounted on the radially inner surface of said casing for reacting to forces placed on said each pad by the shaft.

4. A bearing as in claim 1 wherein said casing includes a pair of axially spaced apart circumferential grooves on its radially inner surface and means communicating with each of said grooves, respectively, for evacuating oil from said bearing, each damming ridge operatively forming a substantially radial barrier between the inner casing surface and the shaft, each ridge spaced from the respective preceeding leading pad to form an arcuate space therebetween and substantially segregating the respective oil reservoir of each respective pad from oil ejected from the respective preceeding leading pad into the arcuate space between said respective damming ridge and the trailing portion of said respective preceeding pad, and ejected oil being evacuated from the arcuate spaces through said grooves and said evacuation means without substantially affecting cooling and lubrication of the corresponding pad of each respective dam.

5. A bearing as in claim 1 wherein each said ridge face includes a layer of babbit thereon.

6. An oil lubricated, tilting journal bearing for supporting a horizontally disposed, rotatable shaft of a large steam turbine, said bearing including a bearing casing, comprising:

a lower bearing pad having an arcuate span of between 70° and 90° of the total circumference of the shaft, said lower pad having its radial centerline negatively displaced between 5° and 20° from the vertical centerline of the shaft, and said lower pad being pivotally mounted on the inner surface of the bearing casing at a first predetermined circumferential location offset from the radial centerline of said lower bearing pad;

at least a first upper pad having an arcuate span of between 40° and 50° of the total circumference of the shaft, said first upper pad having its radial centerline positively displaced between 15° and 25° from the horizontal centerline of the shaft, and said first upper pad being pivotally mounted on said inner surface of said casing at a second predetermined circumferential location offset from the radial centerline of said at least first upper pad;

at least a second upper pad having an arcuate span of between 40° and 50° of the total circumference of said shaft, said second upper pad having its radial centerline negatively displaced between 35° and 45° from the horizontal centerline of the shaft, and said second upper pad being pivotally mounted on said inner surface of said casing at a third predetermined circumferential location offset from the radial centerline of said at least second upper pad, each said lower, first upper and second upper pad respectively including an arcuately extending pad face operatively spaced from the shaft; and means for lubricating each pad, said means for lubricating including a respective feed dam associated with each pad, each said feed dam affixed to the inner surface of said casing proximate yet spaced apart from the leading edge of the respective corresponding pad, each feed dam having a damming ridge extending radially inward from said casing, each damming ridge including an arcuately extending face operatively spaced from the shaft, wherein the respective face of said respective damming ridge is operatively radially spaced from the shaft a distance greater than the operative radial spacing of the respective corresponding pad face from the shaft, each feed dam defining a respective channel between the trailing edge of said respective ridge, the leading edge of said respective corresponding pad, and a respective radially inner channel surface of each respective feed dam, each said channel surface being operatively spaced away from the surface of the shaft, said lubricating means further including supply means for delivering oil into each said channel, thereby creating a reservoir of oil in each said channel such that the while rotating shaft draws oil from said reservoir to form a continuously flowing film of oil across each pad face, said film of oil maintaining the shaft surface in non-wiping contact with each pad face.

7. A bearing as in claim 6 wherein said at least a first upper pad consists of one pad and said at least a second upper pad consists of one pad.

8. In combination with an oil lubricated journal bearing for rotatably supporting a horizontally oriented steam turbine shaft, said bearing including a plurality of pads and a plurality of oil feed dams, one of said plurality of dams disposed immediately adjacent the leading edge of a respective corresponding one of said plurality of pads of said bearing, each respective corresponding pad including an arcuately extending pad face operatively spaced from the shaft and said bearing including a bearing casing, each oil feed dam comprising:

a damming ridge radially extending inward from the inner surface of the bearing casing and extending axially along the length of said respective corresponding pad, said damming ridge including an arcuately extending face operatively radially spaced from the shaft a distance greater than the operative radial spacing of the respective corresponding pad face from the shaft;

a channel defined by the trailing edge of said ridge, the leading edge of said respective corresponding pad and a respective radially inner channel surface of said each oil feed dam, said inner channel surface spaced away from the shaft surface; and means for supplying lubricating oil to said channel thereby creating a reservoir of oil in said channel such that while rotating the shaft draws oil from said reservoir to form a continuously flowing film of oil across the pad face of the respective corresponding pad, said film of oil maintaining the shaft surface in non-wiping contact with said pad face of the respective corresponding pad.

9. A bearing as in claim 8 wherein said plurality of pads consists of three pads.

10. A bearing as in claim 8 wherein said casing includes means for oil evacuation from said casing, and said means for supplying lubricating oil includes a plurality of feed lines respectively radially extending through said plurality of feed dams, respectively.

11. A bearing as in claim 10 wherein each of said plurality of pads space said shaft away from said casing, each damming ridge forms a substantially radial barrier between said inner surface of said casing and the shaft surface, and each said respective damming ridge substantially segregates the respective reservoir of oil for each respective corresponding pad from the arcuate space between each said respective damming ridge and a leading pad of said plurality of pads.

* * * * *